(12) United States Patent
Kotsubo et al.

(10) Patent No.: US 6,310,612 B1
(45) Date of Patent: Oct. 30, 2001

(54) DISPLAY UNIT INTEGRAL WITH TOUCH PANEL BONDED THROUGH AN ADHESIVE COMPOSITION OR AN ADHESIVE FILM AND PRODUCTION METHOD THEREOF

(75) Inventors: Hidefumi Kotsubo; Tetsuo Kitano; Ryo Sakurai; Takahiro Matsuse; Yasuhiro Morimura, all of Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/220,577

(22) Filed: Dec. 23, 1998

(30) Foreign Application Priority Data

| Dec. 24, 1997 | (JP) | .................................................... 9-366495 |
| Dec. 24, 1997 | (JP) | .................................................... 9-366496 |
| Dec. 24, 1997 | (JP) | .................................................... 9-366497 |
| Dec. 24, 1997 | (JP) | .................................................... 9-366498 |

(51) Int. Cl.$^7$ .................................................... G09G 3/36
(52) U.S. Cl. ........................................ 345/173; 178/18.03
(58) Field of Search .......................... 345/173; 178/18.03

(56) References Cited

U.S. PATENT DOCUMENTS 5,731,050 * 3/1998 Kotsubo et al. ........................ 428/1
6,016,134 * 1/2000 Ota ........................................ 345/104

FOREIGN PATENT DOCUMENTS 0 727 471 A2   2/1996   (EP) .
7-105781    *   4/1995   (JP) .

OTHER PUBLICATIONS

Patent Abstracts of Japan, vol. 098, No. 001, Jan. 30, 1998 & JP 09 25 1159 A Sep. 22, 1997 *abstract*.
Patent Abstracts of Japan, vol. 095, No. 010, Nov. 30, 1995 & JP 07 169367 A Jul. 4, 1995 *abstract*.
Patent Abstracts of Japan, vol. 010, No. 094 (C–338), Apr. 11, 1986 & JP 60 226589 A Nov. 11, 1985 *abstract*.

* cited by examiner

Primary Examiner—Donald R. Wilson
(74) Attorney, Agent, or Firm—Sughrue, Mion Zinn, Macpeak & Seas, PLLC

(57) ABSTRACT

A heat- and/or photo-curing adhesive composition to be used in production of a display unit integral with a touch panel by bonding the touch panel to the display unit, the adhesive composition comprising as a main component of one or more than one kind of copolymer selected from (1) ethylene-vinyl acetate copolymer; (2) copolymer of ethylene, vinyl acetate, and acrylate and/or methacrylate monomer; (3) copolymer of ethylene, vinyl acetate, and maleic acid and/or maleic anhydride; and (4) copolymer of ethylene, acrylate and/or methacrylate monomer, and maleic acid and/or maleic anhydride.

10 Claims, 1 Drawing Sheet

DISPLAY UNIT INTEGRAL WITH TOUCH PANEL BONDED THROUGH AN ADHESIVE COMPOSITION OR AN ADHESIVE FILM AND PRODUCTION METHOD THEREOF

BACKGROUND OF THE INVENTION

The present invention relates to an adhesive composition to be used in production of a display unit, such as CRT (cathode ray tube) and LCD (liquid crystal display), integral with a touch panel by bonding the touch panel to the display unit. The present invention also relates to an adhesive film, a display unit integral with a touch panel made with the adhesive composition or adhesive film, and a process for producing them.

In recent years, there has been seen a general use of the display unit integral with a touch panel (which is integrally composed of a touch panel and a display unit such as CRT and LCD) for ATMs and CDs in banks, ticket vending machines in stations, and portable information terminals.

The display unit integral with a touch panel is, as shown in FIG. 2, composed of a touch panel 1, a display unit 2 (such as LCD), and a spacer 3 interposed between them. The touch panel 1 and the display unit 2 are separated from each other by a prescribed gap 4 (about 0.4 mm). Without this gap, the touch panel 1 under pressure by touching will come into direct contact with the display unit 2, thereby blurring the images. This problem is likely to arise in the case of LCD display unit, because the layer of liquid crystal easily distorts to give blurred images.

Unfortunately, the gap between the touch panel and the display unit reflects, scatters, and absorbs light, thereby decreasing the contrast of display, an important factor as a display, by half. This lowers visibility and causes parallax and shade at the time of input.

Therefore, it is desirable to eliminate the gap by bonding the touch panel directly to the display unit. Unfortunately, there has been no adhesive available for this purpose. An adhesive such as epoxy resin adhesive is not suitable because it forms a hard adhesive layer which transmits pressure directly to the display unit when the touch panel is pressed. This results in blurred images. Moreover, an epoxy resin adhesive is poor in wetting properties and hence does not give a uniform adhesive layer.

SUMMARY OF THE INVENTION

It is an object of the present invention to provide an adhesive composition to be used in production of a display unit integral with a touch panel, an adhesive film, a display unit integral with a touch panel, and a process for producing them. The adhesive composition, when used to bond a touch panel directly to a display unit, gives an adhesive layer which has an adequate elastic property or buffering action and is superior in clarity, adhesiveness, and durability, the clarity imparting good visibility to the display unit integral with a touch panel.

The present invention provides the following adhesive composition, adhesive film, display unit and process for producing the display unit.

[I] A heat- and/or photo-curing adhesive composition to be used in production of a display unit integral with a touch panel by bonding the touch panel to the display unit, the adhesive composition comprising as a main component of one or more than one kind of copolymer selected from
  (1) ethylene-vinyl acetate copolymer;
  (2) copolymer of ethylene, vinyl acetate, and acrylate and/or methacrylate monomer;
  (3) copolymer of ethylene, vinyl acetate, and maleic acid and/or maleic anhydride; and
  (4) copolymer of ethylene, acrylate and/or methacrylate monomer, and maleic acid and/or maleic anhydride.

The adhesive composition may be incorporated with an organic peroxide and/or photosensitizer to make it heat- and/or photo-curable through crosslinking. It may also be incorporated with additives such as silane coupling agent, acryloxy group-containing compound, methacryloxy group-containing compound, allyl group-containing compound, and hydrocarbon resin.

[II] An adhesive film for a display unit integral with a touch panel which is formed from the above-defined adhesive composition and has its one side or both sides embossed such that the average surface roughness Ra is 0.1–20 $\mu$m.

[III] A display unit integral with a touch panel which is characterized in that the touch panel and the display unit are bonded together by a heat- and/or photo-cured layer of the above-defined adhesive composition.

[IV] A process for producing a display unit integral with a touch panel, the process comprising interposing the above-defined adhesive composition between the touch panel and the display unit, and then curing the adhesive composition by heat and/or light.

[V] A process for producing a display unit integral with a touch panel, the process comprising interposing the adhesive film being made from the above-defined adhesive composition between the touch panel and the display unit, and then melting and curing simultaneously the adhesive film by heating under reduced pressure.

[VI] A process for producing a display unit integral with a touch panel, the process comprising interposing the adhesive film being made from the above-defined adhesive composition between the touch panel and the display unit, and then melting and curing simultaneously the adhesive film by heating under pressure.

According to the present invention, the adhesive composition and the adhesive film are heat- and/or photo-curable. The adhesive composition can be made into an adhesive film which can be used to bond the touch panel and the display unit together easily and accurately. Having autohesion properties (surface tackiness), the adhesive composition or adhesive film makes it possible to bond the touch panel to the display unit easily at comparatively low temperatures (room temperature to about 80° C.). Owing to its autohesion properties, the adhesive composition or adhesive film permits the bonded parts to be handled freely without displacement and/or peeling before it is cured. After curing, the adhesive composition or adhesive film exhibits good flexibility with a low modulus of elasticity.

When this adhesive composition or adhesive film is used to bond the touch panel directly to the display unit, the resulting display unit integral with a touch panel does not pose the above-mentioned problems (decreased contrast, decreased visibility, parallax at the time of input, display shade, and so on) because there is no gap between the touch panel and the display unit. Owing to adequate elastic properties and buffering action, the display unit integral with a touch panel poses no problem of blurring despite their direct bonding. The adhesion layer formed by the adhesive composition or adhesive film is superior in clarity, adhesiveness, and durability, which contributes to sturdy display units.

The above-mentioned adhesive film, particularly the embossed one, is easy to use in production of display units, because it has no surface tackiness and hence it can be easily moved for accurate positioning when it is interposed between the touch panel and the display unit. Moreover, the embossed adhesive film makes it easy to evacuate air between the touch panel and the display unit under reduced pressure or under pressure. The resulting adhesion layer is uniform freeing from a failure such as entrapped air bubbles and hence permits close adhesion between the touch panel and the display unit.

DETAILED DESCRIPTION OF THE INVENTION

Figure 1:
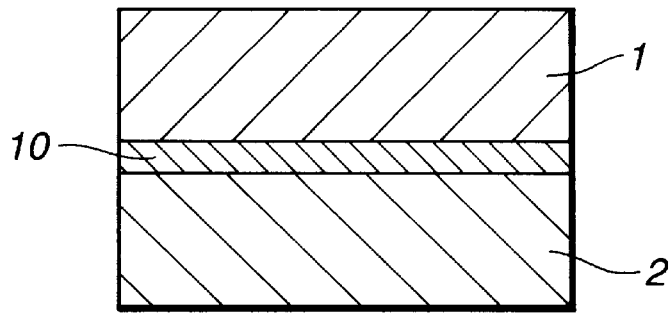
FIG. 1 is a sectional view showing one embodiment of the display unit integral with a touch panel pertaining to the present invention.
Figure 2:
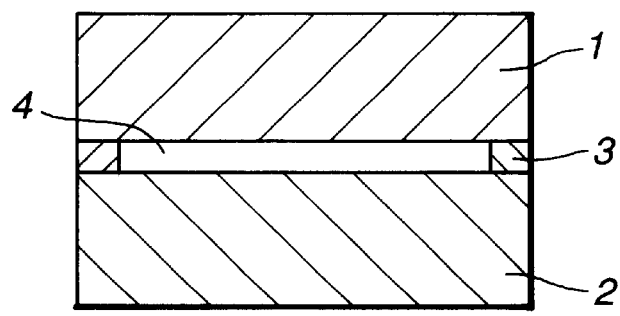
FIG. 2 is a sectional view showing a related art display unit integral with a touch panel.

The adhesive composition of the present invention is a heat- and/or photo-curable adhesive composition which comprises as a main component of one or more than one kind of copolymer selected from;

(1) ethylene-vinyl acetate copolymer;
(2) copolymer of ethylene, vinyl acetate, and acrylate and/or methacrylate monomer;
(3) copolymer of ethylene, vinyl acetate, and maleic acid and/or maleic anhydride; and
(4) copolymer of ethylene, acrylate and/or methacrylate monomer, and maleic acid and/or maleic anhydride.

The ethylene-vinyl acetate copolymer mentioned above in (1) should preferably be one which contains vinyl acetate in an amount of 10–50% by weight, preferably 15–45% by weight, from the standpoint of reactivity at the time of curing and flexibility and durability after curing.

The copolymer of ethylene, vinyl acetate, and acrylate and/or methacrylate monomer mentioned above in (2) should preferably be one which contains vinyl acetate in an amount of 2–50% by weight, preferably 5–20% by weight, from the standpoint of reactivity at the time of curing and flexibility and durability after curing. The acrylate monomer and methacrylate monomer include acrylic acid, methacrylic acid, and esters thereof. Their specific examples are lower alkyl esters of (meth)acrylic acid, such as methyl (meth)acrylate and ethyl (meth)acrylate, and glycidyl (meth)acrylate. They may be used alone or in combination with one another. The content of the acrylate monomer or methacrylate monomer units in the copolymer should be 0.01–20% by weight, preferably 0.05–15% by weight. With a content more than 20% by weight, the adhesive composition may be poor in processability.

The copolymer of ethylene, vinyl acetate, and maleic acid and/or maleic anhydride mentioned above in (3) should preferably be one which contains vinyl acetate in an amount of 10–50% by weight, preferably 15–45% by weight, from the standpoint of reactivity at the time of curing and flexibility and durability after curing. The content of the maleic acid and/or maleic anhydride units in the copolymer should be 0.01–10% by weight, preferably 0.05–5% by weight. With a content more than 10% by weight, the adhesive composition may be poor in processability.

The copolymer of ethylene, acrylate and/or methacrylate monomer, and maleic acid and/or maleic anhydride mentioned above in (4) should preferably be one which contains acrylate and/or methacrylate monomer units in an amount of 1–50% by weight, preferably 1–40% by weight, from the standpoint of reactivity at the time of curing and flexibility and durability after curing. The content of the maleic acid and/or maleic anhydride units in the copolymer should be 0.01–10% by weight, preferably 0.05–5% by weight. With a content lower than 0.01% by weight, the adhesive composition may be poor in adhesiveness. With a content more than 10% by weight, the adhesive composition may be poor in processability. The acrylate monomer and methacrylate monomer include acrylic acid, methacrylic acid, and esters thereof. Their specific examples are lower alkyl esters of (meth)acrylic acid, such as methyl (meth)acrylate and ethyl (meth)acrylate, and glycidyl (meth)acrylate. They may be used alone or in combination with one another.

The adhesive composition of the present invention may be incorporated with an organic peroxide or photosensitizer for its curing. The former is used for the heat-curable adhesive composition and the latter is used for the photo-curable adhesive composition.

The organic peroxide that can be used for the adhesive composition of the present invention may be any one of which decomposes and gives radicals at temperatures equal to or higher than 70° C. Those having a decomposition temperature equal to or higher than 50° C. at a half-life period of 10 hours are preferable. Their selection depends on the manufacturing conditions, film-forming temperature, curing (bonding) conditions, storage stability, and so on.

Examples of the peroxide that can be used in the present invention are as listed below.

2,5-dimethylhexane-2,5-dihydroxyperoxide; 2,5-dimethyl-2,5-di(t-butylperoxy)hexyne-3; di-t-butylperoxide; t-butylcumylperoxide; 2,5-dimethyl-2,5-di(t-butylperoxy)-hexane; dicumylperoxide, α, α'-bis(t-butylperoxyisopropyl)-benzene; n-butyl-4,4-bis(t-butylperoxy)valerate; 2,2-bis(t-butylperoxy)butane; 1,1-bis(t-butylperoxy)cyclohexane; 1,1-bis(t-butylperoxy)-3,3,5-trimethylcyclohexane; t-butyl-peroxybenzoate, benzoylperoxide; t-butylperoxyacetate; methyl ethyl ketone peroxide; t-butylhydroperoxide; p-menthanehydroperoxide; hydroxyheptylperoxide; chlorohexanoneperoxide; octanoylperoxide; decanoylperoxide; lauroylperoxide; cumylperoxy octoate; succinic acid peroxide; acetylperoxide; t-butylperoxy(2-ethylhexanoate); m-toluoylperoxide, benzoyl-peroxide; t-butylperoxyisobutyrate; and 2,4-dichlorobenzoyl-peroxide.

These organic peroxides may be used alone or in combination with one another. Their amount should preferably be 0.1–10 parts by weight for 100 parts by weight of the above-mentioned copolymer.

The adhesive composition may be incorporated with a photosensitizer if it is to be photo-cured. A preferred photosensitizer is a radical photopolymerization initiator of either hydrogen abstraction type or intramolecular cleavage type. Examples of the former type are benzophenone, methyl o-benzoylbenzoate, 4-benzoyl-4'-methyldiphenylsulfide, isopropylthioxanthone, diethylthioxanthone, and ethyl-4-(diethylamino)-benzoate. Examples of the latter type are benzoin ether, benzyldimethylketal, α-hydroxyalkylphenone (e.g., 2-hydroxy-2-methyl-1-phenylpropane-1-one, 1-hydroxy-cyclohexylphenylketone, alkylphenylglyoxylate, and diethoxyacetophenone), α-aminoalkylphenone (e.g., 2-methyl-1-[4-(methylthio)-phenyl]-2-morpholinopropane-1 and 2-benzyl-2-dimethylamino-1-(4-morpholinophenyl)-butanone-1), and acylphosphineoxide.

These photosensitizers may be used alone or in combination with one another. They may be added in an amount of 0.1–10 parts by weight for 100 parts by weight of the above-mentioned copolymer.

The adhesive composition of the present invention may be incorporated with both the above-mentioned organic peroxide and photosensitizer, so that it undergoes both heat-curing and photo-curing.

The adhesive composition of the present invention may be incorporated with a silane coupling agent as an adhesion promoter.

Examples of the silane coupling agent include vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyl-triethoxysilane, β-(3,4-epoxycyclohexyl)ethyltrimethoxy-silane, γ-chloropropylmethoxysilane, vinyltrichlorosilane, γ-mercaptopropyltrimethoxysilane, γ-aminopropyltriethoxy-silane, and N-β-(aminoethyl)-γ-aminopropyltrimethoxysilane. They may be used alone or in combination with one another. They may be added usually in an amount of 0.01–5 parts by weight for 100 parts by weight of the above-mentioned copolymer.

The adhesive composition of the present invention may be incorporated with an epoxy group-containing compound, as exemplified below, to promote adhesion and curing. Triglycidyltris(2-hydroxyethyl)isocyanurate; neopentylglycol diglycidyl ether; 1,6-hexanediol diglycidyl ether; acryl glycidyl ether; 2-ethylhexyl glycidyl ether; phenyl glycidyl ether; phenol glycidyl ether; p-t-butylphenyl glycidyl ether; diglycidyl adipate ester; diglycidyl o-phthalate ester; glycidyl methacrylate, and butyl glycidyl ether. These compounds may be used in the form of oligomer (having an epoxy group-containing molecular weight of hundreds to thousands) or polymer (having a weight-average molecular of thousands to hundreds of thousands). These epoxy group-containing compound may be added in an amount of 0.1–20 parts by weight for 100 parts by weight of the above-mentioned copolymer. They may be used alone or in combination with one another.

The adhesive composition of the present invention may be incorporated with an acryloxy group-, methacryloxy group-, or allyl group-containing compound, as exemplified below, to promote its curing or improve its properties, such as adhesiveness, mechanical strength, heat resistance, moisture heat resistance, and weather resistance.

Derivatives of acrylic acid or methacrylic acid, such as esters and amides are commonly known as a compound for serving this purpose. The esters may have as the residue any of alkyl groups (such as methyl, ethyl, dodecyl, stearyl, and lauryl), cyclohexyl group, tetrahydrofurfuryl group, aminoethyl group, 2-hydroethyl group, 3-hydroxypropyl group, or 3-chloro-2-hydroxypropyl group. The esters may be those which are formed from acrylic acid or methacrylic acid and a polyhydric alcohol such as ethylene glycol, triethylene glycol, polyethylene glycol, glycerin, trimethylol propane, and pentaerythritol. The amides typically include acrylamide. Triallylcyanurate, triallylisocyanurate, diallyl phthalate, diallyl isophthalate, and diallyl maleate are typically known as allyl group-containing compound. They may be used alone or in combination with one another. They may be added in an amount of 0.1–50 parts by weight, preferably 0.5–20 parts by weight, for 100 parts by weight of the above-mentioned copolymer. With an amount less than 0.1 part by weight, they do not produce the effect of improving heat resistance and mechanical strength as intended. With an amount more than 50 parts by weight, they have an adverse effect on production of the adhesive composition and adhesive film.

The adhesive composition of the present invention may be incorporated with either a natural or synthetic hydrocarbon resin for improvement in workability including bonding. Examples of natural hydrocarbon resins include rosin (such as gum rosin, tall oil rosin, and wood rosin), rosin derivatives (such as hydrogenated rosin, disproportionated rosin, polymerized rosin, esterified rosin, and rosin metal salt), terpene resin (such as α-pinene, β-pinene, and terpene phenolic resin), dammar, copal, and shellac. Examples of synthetic hydrocarbon resins include petroleum resin (such as aliphatic petroleum resin, aromatic petroleum resin, alicyclic petroleum resin, copolymer petroleum resin, hydrogenated petroleum resin, pure monomer-based petroleum resin and coumaroneindene resin), phenolic resin (such as alkylphenolic resin and modified phenolic resin), and xylene resin (such as xylene resin and modified xylene resin).

The hydrocarbon resins may be added in an amount of 1–200 parts by weight, preferably 5–150 parts by weight, for 100 parts by weight of the above-mentioned copolymer.

The adhesive composition of the present invention may be incorporated with an adhesion promoter (other than above), anti-aging agent (such as polymerization inhibitor, antioxidant, and ultra violet rays absorber), organic or inorganic filler, and conventionally known flame retardant, in an amount not harmful to its performance. Examples of flame retardants include inorganic ones (such as aluminum hydroxide, antimony trioxide, antimony pentoxide, guanidine sulfamate, guanidine phosphate, guanylurea phosphate, and magnesium hydroxide), halogen-containing ones (such as chlorinated paraffin, tetrabromobisphenol A, decabromodi-phenyloxide, hexabromocyclododecane, octabromodiphenyl ether, 1,2-bis(tribromophenoxy)ethane, ethylenebistetrabromophthal-imide, pentabromobenzylpolyacrylate, and tris(2,3-dibromo-propyl-1)isocyanurate), and phosphorus-containing ones (such as triphenyl phosphate, rheophostriallyl phosphate, octyl cresyl phenyl phosphate, and tricresyl phosphate).

The adhesive composition of the present invention may be used in the form of film prepared from the above-mentioned copolymer and additives by uniform mixing (such as extrusion and rolling) and subsequent calendering, rolling, T-die extrusion, or tubular film extrusion. The film may be embossed so as to facilitate deaeration when the touch panel and the display unit are bonded together by pressing. Embossing may be accomplished in any known way, such as rolling and transfer from a releasable embossed film.

The adhesive film is not specifically restricted in thickness; however, it is usually 50–1000 $\mu$m, preferably 50–500 $\mu$m. Embossing should be carried out such that the embossed film has an average surface roughness Ra of 0.1–20 $\mu$m, particularly 1–15 $\mu$m. The adhesive film with a smoother surface than 0.1 $\mu$m prevents air from being removed (by evacuation or compression) from the gap between the touch panel and the display unit and is poor in workability. The adhesive film with a rougher surface lacks uniformity in adhesiveness and impairs transparency because its embossed rough surface remains after heating and melting. The above-specified surface roughness, setting Ra in the range of 0.1–20 $\mu$m is necessary for easy deaeration, good adhesion, and high transparency and light transmission.

The adhesive composition or film of the present invention should preferably be heat-cured at 70–170° C., more preferably 70–150° C., for 2–60 minutes, more preferably 5–30 minutes, depending on the kind of the organic peroxide to be used. It is recommended that curing be carried out under pressure of 0.01–50 kgf/cm$^2$, preferably 0.1–20 kgf/cm$^2$.

The adhesive composition or adhesive film containing a photosensitizer may be photo-cured by irradiation with light ranging from ultraviolet region to visible region. Light sources that can be used are ultrahigh pressure mercury lamp, high-pressure mercury lamp, low-pressure mercury lamp, chemical lamp, xenon lamp, halogen lamp, mercury halogen lamp, carbon arc lamp, incandescent lamp, and laser. Irradiation time ranges from tens of seconds to tens of minutes, depending on the kind of lamp and the intensity of light source.

According to the present invention, the display unit integral with a touch panel is composed of a touch panel 1 and a display unit 2 and the above-mentioned adhesive composition or adhesive film 10 which is cured, as shown in FIG. 1.

The touch panel may be of any known structure, and the display unit is also of any known structure such as CRT and LCD.

To produce the display unit integral with a touch panel according to the present invention, it is desirable to use the adhesive composition in the form of film or solution. In the latter case, the copolymer and additives mentioned above are uniformly dissolved in a solvent which has no effect on the touch panel and display unit. The resulting solution should be uniformly applied to the surface of the touch panel and/or display unit. With the touch panel and display unit bonded together temporarily under pressure, the adhesive composition is cured by heating for complete bonding.

Bonding may also be accomplished by means of the embossed adhesive film having surface roughness Ra of 0.1–20 μm as mentioned above. This adhesive film is desirable from the standpoint of easy positioning and easy deaeration from the gap between the film and its adjacent members (touch panel and display unit).

The adhesive film is used in the following manner to produce the display unit integral with a touch panel. First, it is cut in size conforming to the touch panel and the display unit and is interposed between them. Then, the resulting laminate is placed in a vacuum chamber to remove air from the gap between the adhesive film and its adjacent members. If this step is carried out in an airtight flexible bag in place of a vacuum chamber, the laminate is entirely pressed by the evacuated bag.

The deaerated laminate is heated at 50–100° C. in a heating furnace in which hot air is circulating, so that the adhesive film melts and simultaneously cures. In this way the step of bonding is completed. If necessary, heating may be carried out under pressure (1–10 kgf/cm$^2$) by using an autoclave. This step is not necessary if an airtight bag is used, because the laminate is pressed by the bag.

Alternatively, bonding may be accomplished in the following way. The adhesive film is interposed between the touch panel and display unit, and the resulting laminate is heated at 50–100° C. in a heating furnace in which hot air is circulating, such that temporary adhesion takes place by the weight of the touch panel itself and by the film melted therein. Then, the laminate is heated at 50–100° C. under pressure (1–10 kgf/cm$^2$) in an autoclave.

According to the present invention, it is possible to produce simply and certainly a display unit integral with a touch panel having good visibility.

EXAMPLE

The invention will be described in more detail with reference to the following examples, which are not intended to restrict the scope of the invention.

Example 1

Figure 3:
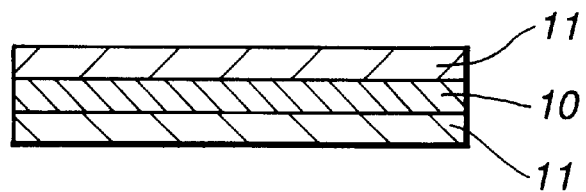
FIG. 3 is a sectional view illustrating one embodiment of the process for producing the embossed adhesive film.

Components shown in Table 1 were dissolved in toluene. The resulting solution was applied to a PET (polyethylene-terephthalate) film with embossing (Ra=2.5 μm) and release coating, such that the resulting coating had a thickness of 100 μm after drying. After drying, the same PET film as mentioned above was laminated onto the other similar PET film to obtain the adhesive film laminate as shown in FIG. 3, in which the PET film embossed and release coated is indicated by 11.

The adhesive film laminate was cut in size conforming to the touch panel, and the PET films on both sides were peeled off. The adhesive film having embossed surfaces on both sides was interposed between a touch panel and an LCD. The laminate was placed in an airtight flexible bag, which was subsequently evacuated by a vacuum pump. The assembly was heated at 80° C. for 1 hour. In this way there was obtained a display unit composed integrally of the touch panel and the LCD.

TABLE 1

| Components (Parts by weight) | |
|---|---|
| Ethylene-vinyl acetate copolymer* | 100 |
| Triallyl isocyanurate | 2 |
| γ-methacryloxypropyltrimethoxysilane | 1 |
| Benzoyl peroxide | 4 |

*(1) "Ultrathene 710" (Ethylene-vinyl acetate copolymer, VA content = 28% by weight, from Tosoh Corp.)
(2) "Ultrathene 627" (Ethylene-vinyl acetate copolymer, VA content = 20% by weight, from Tosoh Corp.)
(3) "Ultrathene 760" (Ethylene-vinyl acetate copolymer, VA content = 42% by weight, from Tosoh Corp.)
(4) "Ultrathene 634" (Ethylene-vinyl acetate copolymer, VA content = 26% by weight, from Tosoh Corp.)
(5) "Ultrathene 750" (Ethylene-vinyl acetate copolymer, VA content = 32% by weight, from Tosoh Corp.)

Example 2

A mixture of the same components as in Example 1 was made into a film by calendering, and the resulting film was embossed (on both sides) by rolling. Thus there was obtained an embossed adhesive film having a thickness of 100 μm (after drying) and surface roughness Ra of emboss= 10.0 μm.

The adhesive film was cut in size conforming to the touch panel and then interposed between the touch panel and the LCD in the same manner as in Example 1. The resulting laminate was heated at 80° C. for 30 minutes in a hot air circulating furnace for temporary bonding. Then the laminate was heated at 80° C. under pressure (5 kgf/cm$^2$) for 30 minutes in an autoclave. In this way there was obtained a display unit composed integrally of the touch panel and the LCD.

Example 3

Components shown in Table 2 were dissolved in toluene. The resulting solution was applied to a PET film with embossing (Ra=2.5 μm) and release coating, such that the resulting coating had a thickness of 100 μm after drying. After drying, the same PET film as mentioned above was laminated onto the other similar PET film to obtain the adhesive film laminate as shown in FIG. 3.

The adhesive film laminate was cut in size conforming to the touch panel, and the PET films on both sides were peeled off. The adhesive film having embossed surfaces on both sides was interposed between a touch panel and an LCD. The laminate was placed in an airtight flexible bag, which was subsequently evacuated by a vacuum pump. Then, the laminate was heated at 80° C. for 1 hour. In this way there was obtained a display unit composed integrally of the touch panel and the LCD.

TABLE 2

| Components (Parts by weight) | |
| --- | --- |
| Ethylene-vinyl acetate-glycidyl methacrylate copolymer* | 100 |
| Neopentylglycol dimethacrylate | 4 |
| γ-methacryloxypropyltrimethoxysilane | 0.5 |
| 1,1-bis(t-butylperoxy)-3,3,5-trimethylcyclohexane | 2 |

*(1) "Bondfast 2A" (Ethylene-vinyl acetate-glycidyl methacrylate copolymer, VA content = 8% by weight, GM content = 3% by weight, from Sumitomo Chemical Co.)
(2) "Bondfast 2B" (Ethylene-vinyl acetate-glycidyl methacrylate copolymer, VA content = 5% by weight, GM content = 12% by weight, from Sumitomo Chemical Co.)
(3) "Bondfast 20B" (Ethylene-vinyl acetate-glycidyl methacrylate copolymer, VA content = 5% by weight, GM content = 12% by weight, from Sumitomo Chemical Co.)
(4) "Bondfast G" (Ethylene-vinyl acetate-glycidyl methacrylate copolymer from Sumitomo Chemical Co.)

Example 4

A mixture of the same components as in Example 3 was made into a film by calendering, and the resulting film was embossed (on both sides) by rolling. Thus there was obtained an embossed adhesive film having a thickness of 100 μm (after drying) and surface roughness Ra of emboss= 10.0 μm.

The adhesive film was cut in size conforming to the touch panel and then interposed between the touch panel and the LCD in the same manner as in Example 3. The resulting laminate was heated at 80° C. for 30 minutes in a hot air circulating furnace for temporary bonding. Then the laminate was heated at 80° C. under pressure (5 kgf/cm²) for 30 minutes in an autoclave. In this way there was obtained a display unit composed integrally of the touch panel and the LCD.

Example 5

Components shown in Table 3 were dissolved in toluene. The resulting solution was applied to a PET film with embossing (Ra=2.5 μm) and release coating, such that the resulting coating had a thickness of 100 μm after drying. After drying, the same PET film as mentioned above was laminated onto the other similar PET film to obtain the adhesive film laminate as shown in FIG. 3.

The adhesive film laminate was cut in size conforming to the touch panel, and the PET films on both sides were peeled off. The adhesive film having embossed surfaces on both sides was interposed between a touch panel and an LCD. The laminate was placed in an airtight flexible bag, which was subsequently evacuated by a vacuum pump. The assembly was heated at 80° C. for 1 hour. In this way there was obtained a display unit composed integrally of the touch panel and the LCD.

TABLE 3

| Components (Parts by weight) | |
| --- | --- |
| Ethylene-vinyl acetate-maleic anhydride copolymer* | 100 |
| Triallyl isocyanurate | 2 |

TABLE 3-continued

| Components (Parts by weight) | |
| --- | --- |
| γ-methacryloxypropyltrimethoxysilane | 0.5 |
| 1,1-bis(t-butylperoxy)-3,3,5-trimethylcyclohexane | 2 |

*(1) "Modic E-100H" (Ethylene-vinyl acetate-maleic anhydride copolymer from Mitsubishi Chemical Co.)
(2) "Modic E-300H" (Ethylene-vinyl acetate-maleic anhydride copolymer from Mitsubishi Chemical Co.)
(3) "Modic E-300S" (Ethylene-vinyl acetate-maleic anhydride copolymer from Mitsubishi Chemical Co.)

Example 6

A mixture of the same components as in Example 5 was made into a film by calendering, and the resulting film was embossed (on both sides) by rolling. Thus there was obtained an embossed adhesive film having a thickness of 100 μm (after drying) and surface roughness Ra of emboss= 10.0 μm.

The adhesive film was cut in size conforming to the touch panel and then interposed between the touch panel and the LCD in the same manner as in Example 5. The resulting laminate was heated at 80° C. for 30 minutes in a hot air circulating furnace for temporary bonding. Then the laminate was heated at 80° C. under pressure (5 kgf/cm²) for 30 minutes in an autoclave. In this way there was obtained a display unit composed integrally of the touch panel and the LCD.

Example 7

Components shown in Table 4 were dissolved in toluene. The resulting solution was applied to a PET film with embossing (Ra=2.5 μm) and release coating, such that the resulting coating had a thickness of 100 μm after drying. After drying, the same PET film as mentioned above was laminated onto the other similar PET film to obtain the adhesive film laminate layer as shown in FIG. 3.

The adhesive film laminate was cut in size conforming to the touch panel, and the PET films on both sides were peeled off. The adhesive film having embossed surfaces on both sides was interposed between a touch panel and an LCD. The laminate was placed in an airtight flexible bag, which was subsequently evacuated by a vacuum pump. The assembly was heated at 80° C. for 1 hour. In this way there was obtained a display unit composed integrally of the touch panel and the LCD.

TABLE 4

| Components (Parts by weight) | |
| --- | --- |
| Ethylene-ethyl acrylate-maleic anhydride copolymer* | 100 |
| Triallyl isocyanurate | 0.5 |
| γ- methacryloxypropyltrimethoxysilane | 2 |
| Benzoyl peroxide | 2 |

*(1) "Bondyne AX8390" (Ethylene-ethyl acrylate-maleic anhydride copolymer, Ethylene = 68% by weight, EA = 30% by weight, MA = 2% by weight, from Sumitomo Chemical Co.)
(2) "Bondyne LX4110" (Ethylene-ethyl acrylate-maleic anhydride copolymer, Ethylene = 91% by weight, EA = 8% by weight, MA = 1% by weight, from Sumitomo Chemical Co.)
(3) "Bondyne HX8290" (Ethylene-ethyl acrylate-maleic anhydride copolymer, Ethylene = 80% by weight, EA = 18% by weight, MA = 2% by weight, from Sumitomo Chemical Co.)

Example 8

A mixture of the same components as in Example 7 was made into a film by calendering, and the resulting film was embossed on both sides by rolling. Thus there was obtained an embossed adhesive film having a thickness of 100 μm (after drying) and surface roughness Ra of emboss=10.0 μm.

The adhesive film was cut in size conforming to the touch panel and then interposed between the touch panel and the LCD in the same manner as in Example 7. The resulting laminate was heated at 80° C. for 30 minutes in a hot air circulating furnace for temporary bonding. Then the laminate was heated at 80° C. under pressure (5 kgf/cm$^2$) for 30 minutes in an autoclave. In this way there was obtained a display unit composed integrally of the touch panel and the LCD.

The above-mentioned examples gave display units superior in contrast without parallax to related art ones having a gap between the touch panel and the LCD.

What is claimed is:

1. A display unit integral with a touch panel which is characterized in that the touch panel and the display unit are bonded together by a heat- or photo-cured layer of an adhesive composition comprising as a main component at least one copolymer selected from the group consisting of:
   (1) an ethylene-vinyl acetate copolymer;
   (2) a copolymer of ethylene, vinyl acetate, and acrylate and/or methacrylate monomer;
   (3) a copolymer of ethylene, vinyl acetate, and maleic acid and/or maleic anhydride; and
   (4) a copolymer of ethylene, acrylate and/or methacrylate monomer, and maleic acid and/or maleic anhydride.

2. The display unit of claim 1, wherein said at least one copolymer of the adhesive composition is at least one copolymer selected from the group consisting of:
   (1) an ethylene-vinyl acetate copolymer in which the content of vinyl acetate units is 10–50% by weight;
   (2) a copolymer of ethylene, vinyl acetate, and acrylate and/or methacrylate monomer in which the content of vinyl acetate units is 2–50% by weight and the content of acrylate and/or methacrylate units is 0.01–20% by weight;
   (3) a copolymer of ethylene, vinyl acetate, and maleic acid and/or maleic anhydride in which the content of vinyl acetate units is 10–50% by weight and the content of maleic acid and/or maleic anhydride units is 0.01–10% by weight; and
   (4) a copolymer of ethylene, acrylate and/or methacrylate monomer, and maleic acid and/or maleic anhydride in which the content of acrylate and/or methacrylate units is 1–50% by weight and the content of maleic acid and/or maleic anhydride units is 0.01–10% by weight.

3. The display unit of claim 1, wherein said layer of an adhesive composition comprises a film having a thickness of from 50 to 1000 μm.

4. The display unit of claim 3, wherein said film has an average surface roughness Ra of 0.1–20 μm due to embossing one or both sides thereof.

5. The display unit of claim 3, wherein said display unit integral with the touch panel is made by a process comprising interposing said film between the touch panel and the display unit, and then curing the adhesive composition by heat and/or light.

6. The display unit of claim 4, wherein said display unit integral with the touch panel is made by a process comprising interposing said film between the touch panel and the display unit, and then melting and curing simultaneously said adhesive composition by heating under reduced pressure.

7. The display unit of claim 4, wherein said display unit integral with the touch panel is made by a process comprising interposing said film between the touch panel and the display unit, and then melting and curing simultaneously said adhesive composition by heating under pressure.

8. A process for producing a display unit integral with a touch panel, said process comprising interposing an adhesive composition between the touch panel and the display unit, and then curing the adhesive composition by heat and/or light,
   wherein said adhesive composition comprises as a main component at least one copolymer selected from the group consisting of:
   (1) an ethylene-vinyl acetate copolymer;
   (2) a copolymer of ethylene, vinyl acetate, and acrylate and/or methacrylate monomer;
   (3) a copolymer of ethylene, vinyl acetate, and maleic acid and/or maleic anhydride; and
   (4) a copolymer of ethylene, acrylate and/or methacrylate monomer, and maleic acid and/or maleic anhydride.

9. A process for producing a display unit integral with a touch panel, said process comprising interposing an adhesive film between the touch panel and the display unit, and then melting and curing said adhesive film by heating under reduced pressures,
   wherein said adhesive film has an average surface roughness Ra of 0.1–20 μm due to embossing one or both sides thereof and said adhesive film is made from an adhesive composition comprising as a main component at least one copolymer selected from the group consisting of:
   (1) an ethylene-vinyl acetate copolymer;
   (2) a copolymer of ethylene, vinyl acetate, and acrylate and/or methacrylate monomer;
   (3) a copolymer of ethylene, vinyl acetate, and maleic acid and/or maleic anhydride; and
   (4) a copolymer of ethylene, acrylate and/or methacrylate monomer, and maleic acid and/or maleic anhydride.

10. A process for producing a display unit integral with a touch panel, said process comprising interposing an adhesive film between the touch panel and the display unit, and then melting and curing said adhesive film by heating under pressure,
    wherein said adhesive film has an average surface roughness Ra of 0.1–20 μm due to embossing one or both sides thereof and said adhesive film is made from an adhesive composition comprising as a main component at least one copolymer selected from the group consisting of:
    (1) an ethylene-vinyl acetate copolymer;
    (2) a copolymer of ethylene, vinyl acetate, and acrylate and/or methacrylate monomer;
    (3) a copolymer of ethylene, vinyl acetate, and maleic acid and/or maleic anhydride; and
    (4) a copolymer of ethylene, acrylate and/or methacrylate monomer, and maleic acid and/or maleic anhydride.

* * * * *